UNITED STATES PATENT OFFICE.

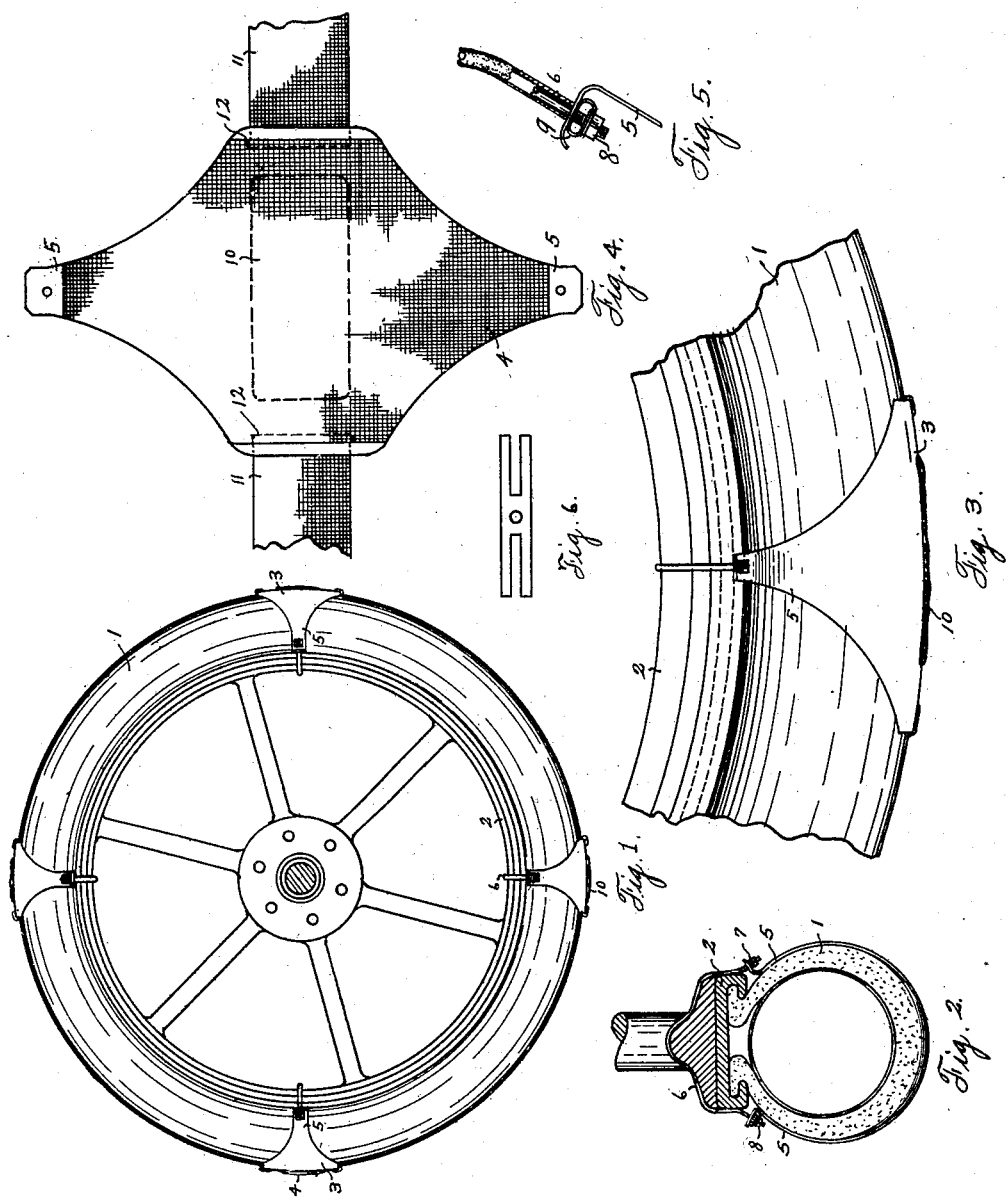

FRANK TUTTLE AND LEWIS T. HALL, OF HOUSTON HEIGHTS, TEXAS; SAID TUTTLE ASSIGNOR TO SAID HALL.

CASING-SHOE.

1,246,360.      Specification of Letters Patent.      Patented Nov. 13, 1917.

Application filed May 19, 1916, Serial No. 98,639. Renewed June 25, 1917. Serial No. 176,898.

*To all whom it may concern:*

Be it known that we, FRANK TUTTLE and LEWIS T. HALL, citizens of the United States, residing at Houston Heights, in the county of Harris and State of Texas, have invented certain new and useful Improvements in Casing-Shoes, of which the following is a specification.

This invention relates to new and useful improvements in a casing shoe.

The object of the invention is to provide a device of the character described adapted to clamp around the tread of a tire casing for the purpose of reinforcing weak places in the casing, for repairing "blow-outs" and for the purpose of preventing the "skidding" of the vehicle.

With the above and other objects in view, the invention has particular relation to certain novel features of construction, arrangement of parts, and use, an example of which is given in this specification and illustrated in the accompanying drawings, wherein:

Figure 1 is a side elevation of a wheel with the device applied thereto,

Fig. 2 is a transverse sectional view of the tire and wheel rim, showing the device applied thereto, Fig. 3 is an enlarged fragmentary side elevation of the tire and rim showing the shoe applied thereto, Fig. 4 shows a view of the inner side of said shoe, Fig. 5 shows a fragmentary view of the securing means, Fig. 6 is a plan view of the washer employed.

Referring now more particularly to the drawings, the numeral 1 refers to the tire casing, which is of the ordinary and well known form and construction and the numeral 2 indicates the wheel rim. The shoe consists of the metallic plate 3, formed into a clamp, and the lining 4. This plate is formed of spring steel and is of a contour to clamp around the tread of the casing and secure itself thereon, and on each side has the ears or extensions 5, 5, whose free ends are turned outwardly and provided with orifices to receive the tie rod 6. This tie rod is covered with a rubber tubing, shown in Fig. 5, to prevent the scarring of the wheel rim, and passes around and conforms to the contour of the rim 2 and its ends pass through the orifices in the ends of the ears and are outwardly threaded to receive the nuts 7 and 8. Interposed between these nuts and the corresponding ears 5, are the washers 9, which have central orifices and end slots, as shown in Fig. 6, and are folded around and overlap each other, the tie rod passing through said end slots, as shown in Fig. 5. The washers are formed of resilient material, such as spring steel and by their resistance against the nuts 7 and 8, lock said nuts and prevent their accidental detachment from the tie rod. The central part of the plate 3 is cut away, as at 10, and the lining 4 is formed of tough durable fabric, and is interposed between the plate 3 and the casing and prevents the contact of the plate against the casing so as to prevent the cutting of the casing by the edges of said plate. At each end the lining 4 is extended, forming the strips 11, 11, which are integral with, and form a part of the lining and these strips are passed through the slits 12, 12 at each end of the plate and are then folded around the plate ends and the free ends of said strips overlap and are clamped between the plate and casing so as to secure the lining firmly in position. The lining will project through the cut away portion 10 and serve to prevent the "skidding" of the wheel on wet and slippery streets and when the shoe is clamped around the casing opposite a weak place or "blow-out", it will serve to strengthen that part of the casing and when a number of shoes of this character are clamped upon a casing, they will prevent the "spinning" of the traction wheels passing through soft mud or over slippery roads.

What we claim is:

1. A casing shoe including a metallic plate having its central portion cut away and having transverse slits cut through the opposite ends thereof, a means securing said plate on the tire tread, a fabric lining interposed between the plate and tread, the opposite ends of said lining being extended, forming strips which pass through said slits and are folded around the respective ends of the plate and are clamped between said plate and tread.

2. In a device of the character described the combination with a metallic plate formed into a clamp which fits closely around and clamps a tire casing, the central part of said plate being cut away and a slit being provided at each end of the plate, of a lining for said plate formed of fabric, said lining being interposed between the plate and casing and being exposed through the cut away portion of the plate so as to contact with the surface over which the tire passes, extensions integral with said lining, said extensions passing through the corresponding slits and having their free ends folded under the plate and securing the lining in position.

In testimony whereof we have signed our names to this specification in the presence of two subscribing witnesses.

FRANK TUTTLE.
LEWIS T. HALL.

Witnesses:
RUBY GLAZNER,
ROBT. J. MCGINNIS.

Copies of this patent may be obtained for five cents each, by addressing the "Commissioner of Patents, Washington, D. C."